Aug. 27, 1968   O. W. HEISE   3,398,584
BOURDON TUBE WITH A SMOOTH INTERNAL STRUCTURE
Filed Feb. 3, 1966   2 Sheets-Sheet 1
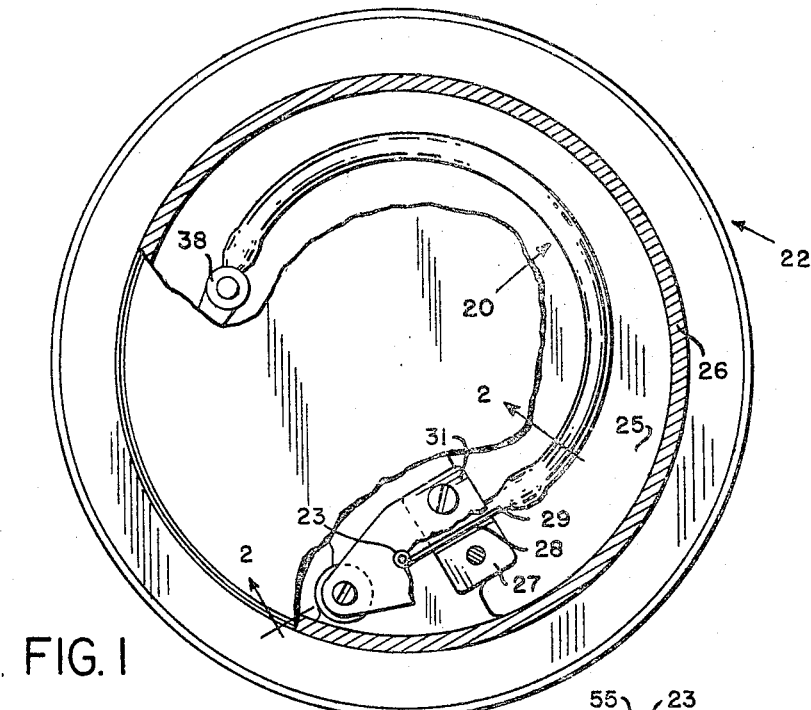
FIG. 1
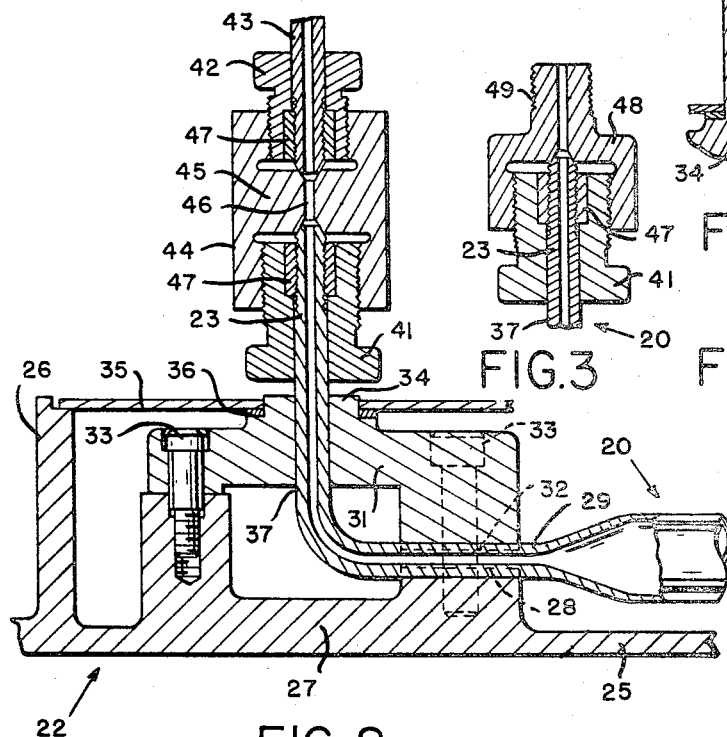
FIG. 2
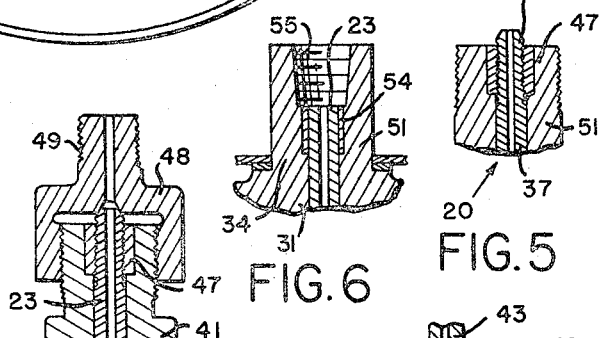
FIG. 3  FIG. 4
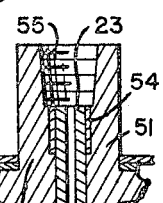
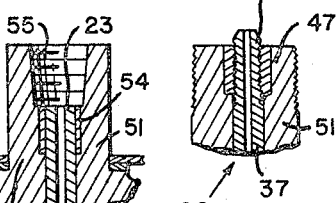
FIG. 6  FIG. 5
OTTO W. HEISE
INVENTOR.
BY Robert H. Ware
ATTORNEY Aug. 27, 1968     O. W. HEISE     3,398,584

BOURDON TUBE WITH A SMOOTH INTERNAL STRUCTURE

Filed Feb. 3, 1966     2 Sheets-Sheet 2

OTTO W. HEISE
INVENTOR

BY Robert H. Ware

ATTORNEY 3,398,584
BOURDON TUBE WITH A SMOOTH
INTERNAL STRUCTURE
Otto W. Heise, c/o Heise Bourdon Tube Co., Inc.,
Newtown, Conn. 06470
Filed Feb. 3, 1966, Ser. No. 524,904
6 Claims. (Cl. 73—418)

ABSTRACT OF THE DISCLOSURE

In a Bourdon tube pressure gauge of the Heise type, a completely smooth interior contour is provided so as to eliminate discontinuities which would otherwise cause turbulence and result in the deposit of solid contaminants, providing a smooth uniform internal surface extending from a vent end through a partially flattened, thin-walled deflecting portion with concentric cylindrical side walls into a relatively thick-walled outlet end.

---

This invention relates to improved Heise Bourdon tubes employed in Bourdon tube pressure gauges, and to methods for fabricating these improved Heise Bourdon tubes for use in high precision pressure gauges substantially eliminating all internal discontinuities to facilitate the purging of foreign matter from the inside surfaces of such tubes.

Bourdon tube pressure gauges have been manufactured for more than a century, and their customary accuracy of plus or minus one percent is acceptable for many commercial applications. With the advent of such high-precision technologies as micro-electronics and space travel, pressure gauges providing at least ten times greater accuracy have been called for.

One important source of difficulty with conventional pressure gauges has been the deposit of films or particles of foreign matter within the Bourdon tube of such gauges by the high pressure gas or liquid. Irregularities, discontinuities, and sharp changes of internal diameter within the Bourdon tube or its connecting conduits and fittings apparently provide pockets where eddies or turbulence occur. At these points, heavier components may separate and adhere to the internal walls of the Bourdon tube, or particulate foreign matter may be precipitated or deposited inside the Bourdon tube, or in the connecting passageways. This creates the danger that such foreign matter will be carried away from such deposits to contaminate lines, pressure sources or associated equipment. Effective purging of these crevices and pockets in conventional Bourdon tube gauges is virtually impossible.

In the Heise Bourdon tubes of the present invention, smooth continuous internal contours extend from the central "flexing" portion to both ends of the Bourdon tube, which protrude beyond the gauge casing for direct connection with external sources of pressurized fluids or safety limit valves. These smooth internal contours minimize or eliminate discontinuities, internal corners and crevices and sharp changes of internal diameter.

Accordingly, a principal object of the invention is to provide Heise Bourdon tubes for high precision pressure gauges having smooth internal surfaces without discontinuities or sharp changes in internal diameter.

Another object is to provide such Heise Bourdon tubes with extended outlet terminal ends designed to protrude beyond the gauge casing for direct connection with pressure supply conduits.

A further object of the invention is to provide methods for the production of such Heise Bourdon tubes with maximum efficiency and economy.

Other and more specific objects will be apparent from the features, elements, combinations and operating procedures disclosed in the following detailed description and shown in the drawings, in which:

FIGURE 1 is a rear face elevation view, partially cut away, of a pressure gauge incorporating a Heise Bourdon tube of the present invention.

FIGURE 2 is an enlarged fragmentary sectional side elevation view, taken along the line 2—2 shown in FIGURE 1, showing the extended terminal end of the Heise Bourdon tube and its mounting and connection in the gauge of FIGURE 1.

FIGURES 3, 4, 5 and 6 are fragmentary side elevation views, corresponding to the view of FIGURE 2, showing alternative connections and fittings for pressurized fluid connections to the Heise Bourdon tube in the gauges of this invention.

Figure 13:
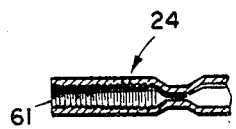
FIGURE 13 is a fragmentary sectional side elevation view of a portion of a modified tube in the stage of its fabrication shown in FIGURE 8.

Many of my prior patents including United States Patents 1,525,128; 1,835,044; 2,116,628; 2,895,334; and 3,004,434 are concerned with the desgin and construction of Bourdon-type pressure gauges. For example, my Patent 3,004,434 describes a highly useful linkage for converting deflection of the Bourdon tube in such gages into a dial pressure indication by mechanically coupling the dial pointer to the free end of the Bourdon tube with a carefully-designed temperature compensation mechanisms temperature compensated mechanism. However, even carefully-designed temperature compensation mechanisms and high precision fabrication techniques cannot counteract the effects of grit, sediment, foreign particles or deposits of lubricating oil or other materials which may collect inside the Bourdon tube in such devices, creating the risk of contaminating associated equipment. Such materials are often entrapped at points of sharp changes of internal diameter, and particularly at points where threaded couplings and fittings connect external pressure tubing to the Bourdon tube of the gauge itself. Effective purging of such trapped materials is extremely difficult.

The Heise Bourdon tubes of the present invention have been provided with unusually smooth, continuous internal contours to eliminate all such internal discontinuities. In addition they are provided with elongated portal ends extending smoothly and continuously past the gauge mechanism and the outside gauge casing for direct connection to external pressure tubing without the use of intermediate couplings and fittings.

A pressure gauge incorporating a Heise Bourdon tube of this invention is shown in FIGURE 1, where the tube 20 is shown mounted in its operating position inside guage casing 22. As indicated in the drawings, a Heise Bourdon tube of the present invention is a thin-walled hollow tube having an elongated, partially-flattened central section smoothly curved into a precise substantially circular arc of 180 degrees to 240 degrees or more, for example. The ends of the tube 20 are suitably formed for pressure-tight connections to external tubing. Thus an outlet portal end 23 of tube 20 is formed with an externally threaded end having a coned tip adapted to fit standard coupling connections, while the opposite end of the tube 20 is formed as an internally threaded vent end 24 within which a threaded needle-type vent tip may be installed, to seal vent end 24 or to be removed for purging tube 20.

Figure 14:
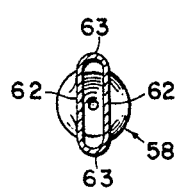
FIGURE 14 is a cross-sectional end elevation view of the tube shown in FIGURE 9, illustrating its flattened configuration.
Figure 9:
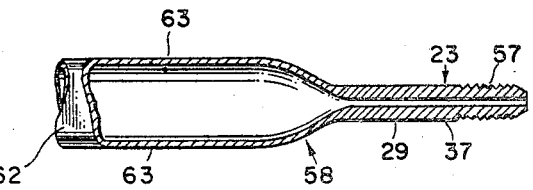
Figure 12:
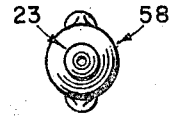
Figure 15:
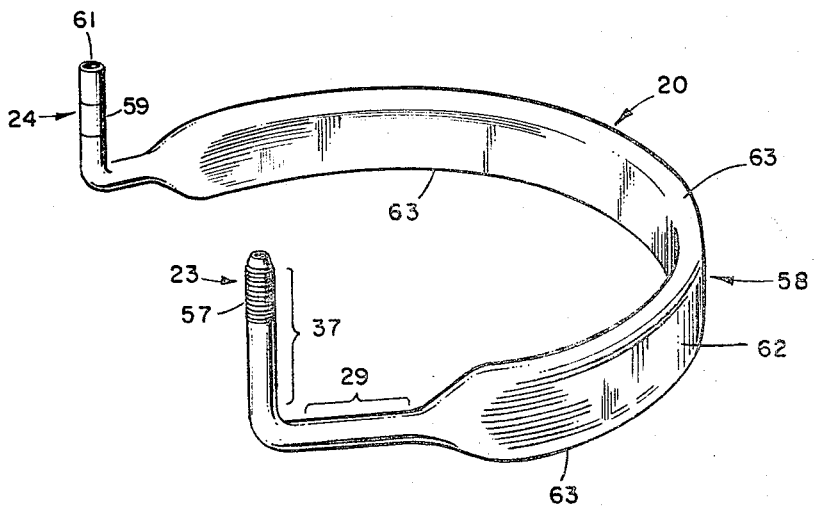
FIGURE 15 is a perspective view of a completed Heise Bourdon tube of the present invention with its central portion curved and its ends extending substantially at right angles to protrude through the gauge casing.

As indicated in FIGURES 9, 14 and 15, the curved portion 58 of the Heise Bourdon tube 20 is partially flattened to give it a major dimension parallel to the axis of curvature and a lesser dimension in a radial direction. This flattening substantially enhances the "straightening" deflection of the Bourdon tube 20 under pressure, and this deflection is utilized through such translating linkages as that shown in my Patent 3,004,434 to provide direct visual dial indications of the pressure supplied to the inside of the Bourdon tube 20.

The outlet end 23 of the Heise Bourdon tube 20 is firmly clamped directly to the heavy cast metal case 22 of the gauge itself, as shown in FIGURE 2, where a "solid front" gauge is illustrated having its front wall 25 and its generally cylindrical side wall 26 cast as a massive integral unit. A sturdy clamping base 27 projects inward from the inner surface of front wall 25, presenting a cylindrical concave groove 28 to receive an elongated cylindrical clamping section 29 of outlet end 23 of the Heise Bourdon tube 20, as shown in FIGURE 2. The threaded and coned outlet tip 23 may lead directly through the side wall 26 of the guage 22 if desired. In the drawings, however, outlet end 23 has been shown curved to extend substantially perpendicular to clamping section 29 of the tube 20, and it is formed with sufficient length to extend directly through the rear wall of the gauge 22.

A sturdy clamping block 31 is dimensioned for firm clamping engagement with clamping base 27 and provided with a clamping groove 32 corresponding to the groove 28 in base 27 and designed to grip the exposed side of clamping section 29 of tube 20. As shown in FIGURES 1 and 2, clamping bolts 33 secure the mating clamping block 31 and the clamping base 27 together, and the clamping block 31 is provided with a stepped boss 34 extending through a mating aperture formed in a back blowout disk 35 covering the rear of the casing 22, with a ring of packing material 36 being positioned between the stepped boss 34 and the inner face of the blowout disk 35. Extending through the stepped boss 34 of the clamping block 31 is an aperture formed to receive the rearwardly extending portal portion 37 of outlet tip 23 of the tube 20. As shown in FIGURES 2 and 15, portal portion 37 and clamping section 29 of tube 20 have their axes substantially perpendicular.

Back blowout disk 35 provides important safety advantages in such gauges, which are occasionally subject to excessive overloading by unusually high pressures admitted to the Heise Bourdon tube 20. Any abnormal rise of pressure within the gauge casing 22 flexes the back blowout disk 35 away from its seat at the rim of side wall 26, against which it is spring loaded; such flexing of blowout disk 35 releases this pressure rearwardly from the inside of gauge casing 22 without danger to operating personnel stationed before front wall 25 of the gauge casing.

Deflections of the unsupported vent end 24 caused by varying fluid pressures inside the Heise Bourdon tube 20 shown in FIGURE 15 are converted into dial indications of pressure, and vent end 24 is held in a lightweight linkage clamp 38 connected to transmit the deflection of vent end 24 to an indicating linkage like that shown in my Patent 3,004,434, for example.

A variety of different pressure connections may be employed to connect the portal portion 37 and outlet end 23 of the Heise Bourdon tubes of this invention to sources of pressure to be measured by the gauge 22. Examples of suitable pressure connections are shown in FIGURES 2, 3, 4, 5 and 6. In FIGURE 2 a pair of threaded collars 41 and 42 are mounted respectively surrounding the outlet end 23 of the Heise Bourdon tube 20 and a length of tubing 43. Collars 41 and 42 are threadedly engaged with a threaded sleeve coupling 44 having a reduced central seat portion 45 provided with coned seats joining a central bore 46 and shaped to receive the coned ends of outlet tip 23 and tubing 43. Both tip 23 and tubing 43 are externally threaded with lefthand threads to accommodate internally lefthand threaded clamping rings 47, which are loosely seated within ring-shaped portal apertures in the facing ends of the collars 41 and 42. During assembly, the threaded collars 41 and 42 are first respectively backed on to the outlet tip 23 of Heise Bourdon tube 20 and the end of tubing 43 to be joined thereto, and the clamping rings 47 are engaged and threaded upon the mating lefthand threads of components 23 and 43. Sleeve coupling 44 is then placed between the units 23 and 43 and threaded collars 41 and 42 are respectively advanced toward and threaded into the mating end portals of the sleeve coupling 44. Since clamping rings 47 and threaded collars 41 and 42 are not joined to each other, threading advance of the collars 41 and 42 approaching each other within the sleeve coupling 44 will merely cause sliding and then binding frictional engagement between the collars 41 and 42 and their respective clamping rings 47 driving both the outlet tip 23 and the tubing 43 into firm seated engagement with the coned seats at opposite ends of the central bore 46 in the reduced seat portion 45 of sleeve coupling 44, and thus forming a firm pressure-tight connection.

Modifications of the connection of FIGURE 2 are shown in FIGURES 3–6. In FIGURE 3 a coupling 41 is installed on outlet tip 23 of portal portion 37 of Heise Bourdon tube 20 and a clamping ring 47 is mounted on the thread at the end of outlet tip 23 just behind the coned end seat portion thereof. In place of the sleeve coupling 44 shown in FIGURE 2, however, a pipe connector-adapter 48 is engaged with the threaded collar 41, and its central bore with a central coned seat is brought directly into engagement with the coned end of outlet tip 23. At the opposite end of the pipe connector-adapter 48, an external pipe thread 49 is presented to receive an internally threaded pipe, not shown.

In FIGURE 4 a tubing connection generally similar to FIGURE 2 has been modified to combine the threaded collar 41 directly with the boss 34. Thus, in FIGURE 4, the boss 34 protruding through the back blowout disk 35 is provided with an extending sleeve portion 51 externally threaded to engage a sleeve coupling 52. In this embodiment, however, the outlet tip 23 of the Bourdon tube 20 is provided with an internally recessed coned socket seat 53 for direct seating engagement with the coned protruding tip of the tubing 43. To avoid spreading or deformation of the socket seat 53, this terminal end of the outlet tip 23 is recessed flush within the central bore of the boss sleeve 51 and integrally secured therein, as by a collar of silver solder braze 54. Threaded collar 42 is provided with a clamping ring 47 engaged by a thread on the external tip of the tubing 43 to provide firm clamping engagement of tubing 43 and seat 53 as described above.

If a pipe connector-adapter 48, as shown in FIGURE 3, is to be used with the protruding boss sleeve portion 51 for direct connection of a larger pipe with the outlet tip 23 in the manner shown in FIGURE 3, an external coned seat may be formed on outlet tip 23, as shown in FIGURE 5, and a threaded clamping ring 47 seated in a recess in sleeve portion 51 may be employed in the same manner as in the collar 41 of FIGURE 3 to present the outlet tip 23 for firm axial seated engagement in a seat recess in the bore of pipe connector-adapter 48, as clearly indicated in FIGURE 5.

A further modification of the boss sleeve portion 51 is shown in FIGURE 6, where outlet tip 23 is again shown recessed flush with the end of the bore in the sleeve portion 51 and anchored in position by a collar of silver solder braze 54. Outlet top 23 thus communicates directly with an enlarged, internally-threaded pipe portal 55 formed in the protruding end of the boss sleeve portion 51.

Figure 7:
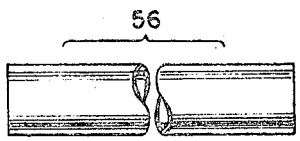
FIGURES 7, 8 and 9 are side elevation views of a length of tubing at different successive stages of its fabrication into a Heise Bourdon tube of the present invention.
Figure 10:
FIGURES 10, 11 and 12 are end elevation views of the tube in the successive stages respectively shown in FIGURES 7, 8 and 9.

The Heise Bourdon tube 20 of this invention shown in FIGURE 15 may be formed from a single length of rolled tubing 56, as shown in FIGURES 7 and 10. Successive stages in the formation of this component are shown in FIGURES 7, 8, 9 and 15. After severing and smoothing the ends of a selected length 56 of tubing, each end may have its external diameter reduced and its wall thickness increased by conventional techniques to produce the reduced vent end 24, clamping section 29 and portal portion 37 shown in FIGURE 8. The outlet tip 23 may be provided with a coned end of approximately a 30-degree angle from the axis of the tube, as shown in the figures, and a thread 57 may be formed in the external surface of the outlet tip just back of this coned end, to cooperate with the clamping rings 47 shown in FIGURES 2, 3 and 5. A central or deflecting portion 58 of the tube 56 may be left with the same wall thickness as the original tube 56, or if desired the deflecting portion 58 may have its thickness reduced by external grinding or machining techniques to increase the sensitivity of the Heise Bourdon tube 20.

Figure 8:
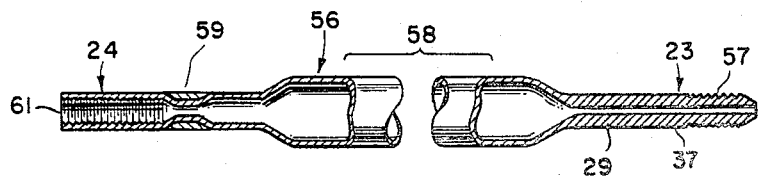
Figure 11:
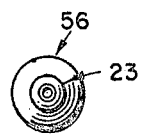

The opposite or vent end 24 of the tube 56 may similarly have its external diameter reduced and its wall thickness increased, to a lesser extent than the outlet tip 23 if desired, as shown in FIGURE 8, to form a valve seat for a needle-type vent tip, and it may also be provided with a portion of internally reduced diameter enclosed by a collar 59 as shown in FIGURE 8 or without such a collar as indicated in FIGURE 13. Internal thread 61 may be formed inside vent end 24 to receive a needle-type sealing vent screw or cap closing the tube 20 for use, and removable for purging.

After the formation of the reduced outlet tip 23 and vent end 24, the central deflecting portion 58 of the Heise Bourdon tube 20 is subjected to suitable forming or rolling techniques, to shape this deflecting portion 58 into a partially-flattened configuration as shown in FIGURES 9 and 14 having thin, substantially flat side walls 62 joined by arcuate smoothly curved top and bottom walls 63 in a smooth, continuous, unbroken cross-section as shown in FIGURE 14.

Finally, the central deflection portion 58 is smoothly curved, taking suitable precautions to avoid buckling of its thin walls, to form the arched Heise Bourdon tube 20 shown in FIGURE 15 wherein the side walls 62 of the deflecting portion 58 are curved to form parallel segments of right circular cylinders which are substantially concentric about the axis of curvature of the deflecting portion 58, while maintaining the tube cross section as shown in FIGURE 14.

Thus the central deflecting portion 58 blends smoothly into vent end 24 and outlet tip 23 with smooth continuous internal surfaces, as shown in FIGURES 2, 8 and 9. In this way, internal traps and corners are eliminated from the pressure passage of the gauge 22 for positive cleaning and maximum purging effectiveness, and the risks of deposits of grit, sediment and foreign matter are substanitally eliminated.

While the objects of the invention are efficiently achieved by the preferred forms of the invention described in the foregoing specification, the invention also includes changes and variations falling within and between the definitions of the following claims.

I claim:
1. A Bourdon tube designed for installation in a Bourdon-type pressure gauge, formed of a single unitary length of tubing and having:
(A) a relatively thin-walled central deflecting portion,
(1) smoothly curved in a substantially circular arc about a central axis of curvature,
(2) and partially flattened wih a smooth continuous cross-section of uniform wall thickness having substantially right circular cylindrical side walls concentric with the axis of curvature and joined by arcuate top and bottom walls,
(B) a relatively thick-walled outlet end with an opening at its terminus,
(1) having a smooth internal wall surface tapering to define an inside diameter smaller than any inside dimension of said deflecting portion and blending continuously into the internal surface of the deflecting portion at one end thereof, and defining a smooth inside wall continuing from said one end through to said terminal opening so as to avoid re-entrant cavities along the entire length of said outlet end,
(2) and having a clamping portion with a substantially straight cylindrical external surface,
(C) and a second, opposite vent end.
2. The tube defined in claim 1 wherein the vent end is
(1) adapted to receive removable sealing means and to support clamping means joining the tube to a movable indicating gauge mechanism,
(2) and has a smooth internal wall surface blending continuously into the internal surface of the deflecting portion at the other end thereof.
3. A Bourdon tube designed for installation in a Bourdon-type pressure gauge, formed of a single unitary length of tubing and having:
(A) a relatively thin-walled central deflecting portion,
(1) smoothly curved in a substantially circular arc about a central axis of curvature,
(2) and partially flattened with a smooth coninuous cross-section of uniform wall thickness having substantially right circular cylindrical side walls concentric with the axis of curvature and joined by arcuate top and bottom walls,
(B) a relatively thick-walled outlet end
(1) having a smooth internal wall surface blending continuously into the internal surface of the deflecting portion at one end thereof,
(2) and having a clamping portion with a substantially straight cylindrical external surface,
(C) and a second, opposite vent end,
(D) said outlet end extending a substantial distance beyond its clamping portion to protrude from the casing of the Bourdon-type pressure gauge in which the tube is designed for installation.
4. The tube defined in claim 3 wherein the terminal portion of the outlet end is provided with an outlet tip formed for direct connection with an external pressure conduit.
5. The tube defined in claim 3 wherein the outlet end extends substantially parallel to the axis of curvature.
6. The tube defined in claim 1 wherein the vent end extends substantially parallel to the axis of curvature.

References Cited

UNITED STATES PATENTS 2,478,022   8/1949   Sugden _____ 73—418
3,222,933   12/1965  Howard _____ 73—418

FOREIGN PATENTS 562,305   8/1923   France.

OTHER REFERENCES

Wolf, An Elementary Theory of the Bourdon Gage in The Journal of Applied Mechanics, vol. 13, number 3, pages A–207 to A–210, September 1946.

DAVID SCHONBERG, *Primary Examiner.*

DENIS E. CORR, *Assistant Examiner.*